C. C. KADEL.
SECTIONAL NUT.
APPLICATION FILED NOV. 28, 1910.
1,001,042.
Patented Aug. 22, 1911.
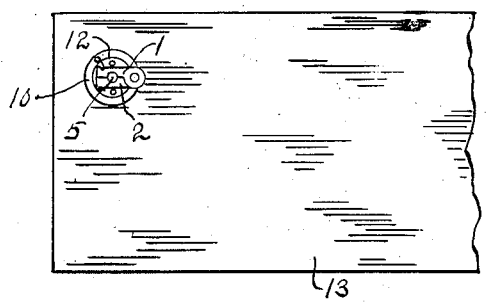
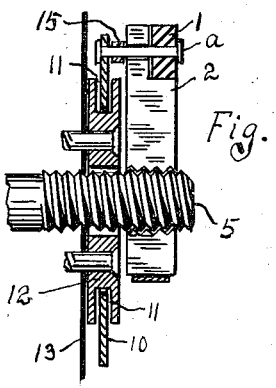
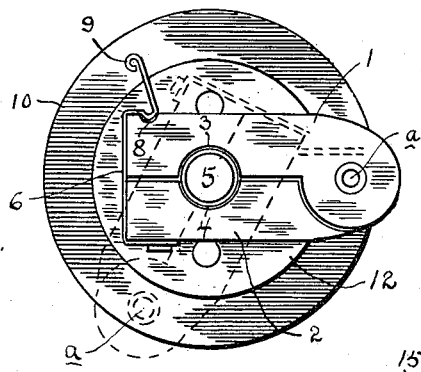
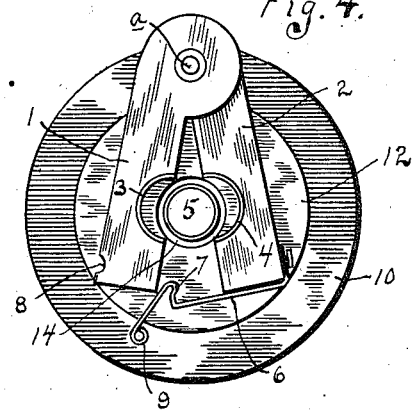
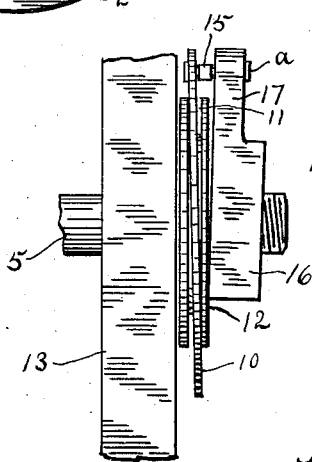
Witnesses
Charles H. Woodburn
Mignon J. Haskell
Inventor
Clyde C. Kadel.
By Walter N. Haskell.
his Attorney

UNITED STATES PATENT OFFICE.

CLYDE C. KADEL, OF ROCK FALLS, ILLINOIS.

SECTIONAL NUT.

1,001,042.   Specification of Letters Patent.   Patented Aug. 22, 1911.

Application filed November 28, 1910. Serial No. 594,489.

*To all whom it may concern:*

Be it known that I, CLYDE C. KADEL, a citizen of the United States, residing at Rock Falls, in the county of Whiteside and State of Illinois, have invented certain new and useful Improvements in Sectional Nuts, of which the following is a specification.

My invention pertains to sectional nuts for bolts, which can be quickly released from engagement with the thread of the bolt, and replaced in position thereon. There is also provided a supporting means for the nut, which renders it of special advantage to be used with the end-gate rods of wagons. There is also embodied in the device a self-locking feature by means of which the nut can be held from accidental release when fully seated in position on the bolt.

The preferred form of my invention is set forth in the specification herein, and shown in the drawings accompanying the same, but I am aware that variations thereof may be produced without departing from the spirit of the invention, and I therefore do not limit myself to the exact form or combination of parts herein set forth.

In the drawings Figure 1 shows a portion of the rear end of a wagon, with my device in position as the fastening means for the end-gate rod thereof. Fig. 2 is a vertical longitudinal section centrally of my invention, when applied to said use. Fig. 3 is a plan view of my device, in position on the threaded end of a rod or bolt. Fig. 4 is a similar view, with the parts of the nut detached. Fig. 5 is a side elevation, showing a modified form of the invention.

Corresponding parts are indicated by similar figures of reference throughout the drawings.

The nut is formed of two similar parts, 1 and 2, pivotally united as at *a*, and provided with semicircular recesses 3 and 4, provided with threads corresponding with the threads on the bolt 5, and adapted to engage the same when the parts 1 and 2 are in closed position. Fixed to the part 2 is a spring 6, provided with a catch 7, which engages a small recess 8 near the free end of the part 1, when the parts of the nut are in closed position, and holds such parts from accidental release. The spring 6 is further projected into a handle 9, by means of which it can be operated to lock the jaws 1 and 2 together or release them.

To place the nut in position the sections thereof are closed upon the threaded portion of the bolt, at a point thereon where the nut will be as nearly seated as possible, and the parts secured by the spring 6. The nut is then turned in the usual manner until it is fully seated. To release the nut it is turned rearwardly until it turns freely, whereupon the spring 6 is released, permitting the nut to be quickly detached. By this means the time and labor usually employed in turning the nut upon the thread of the bolt for the entire length thereof, in placing the nut in position or removing the same, is obviated.

In the drawings the pivot of the nut is shown attached to a circular plate 10, which is rotatably held in an annular recess 11 in a circular plate 12, fixed to the side 13 of the wagon. Centrally of the plate 12 is an opening 14, through which projects the threaded end of the rod or bolt 5. The operation of seating the nut upon the bolt and removing the same therefrom is the same as above described, except that the pivot of the nut has a permanent means of support in the plate 10, which turns therewith in the operation of seating or unseating the nut. A different position of the nut is shown in broken lines in Fig. 3. The plate 10 not only affords a free rotation of the nut upon the bolt, but such nut is at all times attached to the wagon or other part to which it is applied, and there is no possibility of the same becoming mis-laid or lost.

After the rod or bolt has been removed from engagement with the fastening means, wherein the plate 10 is employed, the preferred position of the nut is as shown in Fig. 4, with the pivotal point directly above the opening 14, in which position the end of the rod can be returned to its former position without interference from the jaws 1 and 2, which hang on either side of such opening. When the parts 1 and 2 are separated they are held from accidental closing by the catch 7 of the spring 6.

Between the plate 10 and part 2 of the nut is interposed a bearing 15, the thickness of which is slightly greater than the outer flange of the plate 12, and as the nut is forced inwardly upon the bolt, and becomes seated against the plate 12, the pivotal point of the nut is held away from the plate 10 by said bearing, operating to throw the nut slightly out of line, and causing sufficient friction between the threads of the nut and those of the bolt to prevent accidental turning or release of the nut. There is also a tendency to force that part of the plate 10 in which the pivot is fixed, inwardly, and against the inner flange of the plate 12, the opposite side of the plate 10 being thereby forced outwardly against the outer flange of such plate. The additional friction thus produced aids further in preventing the movement of the nut upon the bolt. This is shown in somewhat exaggerated form in Fig. 5, in which the divided nut is shown replaced by a solid nut 16, having a projection 17, which forms the pivotal means of support therefor. It is obvious that the continued turning of the nut inwardly against the plate 12 results in an increasing amount of friction between the parts mentioned.

What I claim as my invention and desire to secure by Letters Patent of the United States, is:

1. A sectional nut, formed of two similar parts, pivotally united, and provided with a central threaded opening; a recess near the outer end of one of said parts; and a spring, fixed to the other of said sections, and provided with a catch adapted to engage said recess, and hold said parts normally in contact with each other.

2. In a device of the class named, a rotatably mounted plate; a pair of similar nut sections pivoted thereto at a common point, and provided with a central threaded opening; and means for locking said sections in closed position.

3. In a device of the class named, a stationary circular plate provided with an annular recess; a circular plate rotatively held in said recess; a pair of similar nut sections, pivotally united, and supported on said rotatable plate at their pivotal point; and a spring catch, fixed to one of said sections, and adapted to engage the other of said sections and hold such parts normally in contact with each other.

4. In a device of the class named, a stationary plate having an annular recess; a circular plate rotatively held in said recess; a pair of similar nut sections, pivotally united, and supported on said rotatable plate at their pivotal point; a bearing interposed between said rotatable plate and said nut, at the pivotal point thereof, the thickness of said bearing being greater than that of the outer flange of said stationary plate; and means for locking said sections in closed position.

5. The combination of a stationary plate, provided with an annular recess; a circular plate, rotatively held in said recess; a nut, pivotally attached to said rotatable plate; and a bearing between said rotatable plate and nut, at the pivotal point thereof, such bearing having a greater thickness than that of the outer flange of said stationary plate.

In testimony whereof I affix my signature in presence of two witnesses.

CLYDE C. KADEL.

Witnesses:
W. N. HASKELL,
W. H. KADEL.